(12) United States Patent
Kelly et al.

(10) Patent No.: US 6,802,491 B1
(45) Date of Patent: Oct. 12, 2004

(54) FLUID SHUT OFF VALVE CARTRIDGE WITH QUICK CONNECTION

(75) Inventors: Shad A. Kelly, Madison Heights, MI (US); Daniel H. Walker, Sylvan Lake, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 333 days.

(21) Appl. No.: 10/137,225

(22) Filed: Apr. 30, 2002

(51) Int. Cl.[7] ................................................. F16L 37/28
(52) U.S. Cl. ................................. 251/149.6; 137/515.5
(58) Field of Search .................. 201/149.6; 137/515.5; 285/319

(56) References Cited

U.S. PATENT DOCUMENTS

| | | | |
|---|---|---|---|
| 1,430,986 A | 10/1922 | Halman | |
| 2,318,965 A | 5/1943 | Parker et al. | |
| 2,327,611 A | 8/1943 | Scheiwer | |
| 2,354,255 A | 7/1944 | Gillum et al. | |
| 2,412,685 A | 12/1946 | Hoffman et al. | |
| 2,730,382 A | 1/1956 | De Mastri | |
| 3,177,018 A | 4/1965 | Goodwin | |
| 3,567,175 A | 3/1971 | Sciuto, Jr. | |
| 3,698,742 A | 10/1972 | Jones et al. | |
| 3,873,062 A | 3/1975 | Johnson et al. | |
| 3,995,659 A | 12/1976 | Cantore | |
| 4,155,374 A | 5/1979 | Diehl | |
| 4,376,359 A | 3/1983 | Redman | |
| 4,436,125 A | 3/1984 | Blenkush | |
| 4,470,575 A | 9/1984 | Stoll | |
| 4,498,658 A | 2/1985 | Mikiya | |
| 4,613,112 A | 9/1986 | Phlipot et al. | |
| 4,674,529 A | 6/1987 | Ferguson | |
| 4,800,925 A | 1/1989 | Yeoman | |
| 4,819,908 A | 4/1989 | Norkey | |
| 4,825,893 A | 5/1989 | Gailey | |
| 4,936,544 A | 6/1990 | Bartholomew | |
| 4,979,721 A | 12/1990 | Gilbert | |
| 5,056,756 A | 10/1991 | Norkey et al. | |
| 5,213,376 A | 5/1993 | Szabo | |
| 5,273,254 A | 12/1993 | McNaughton et al. | |
| 5,277,402 A | 1/1994 | Szabo | |
| 5,285,807 A | 2/1994 | Nitzberg | |
| 5,478,046 A | 12/1995 | Szabo | |
| 5,544,858 A | 8/1996 | Rogers et al. | |
| 5,582,204 A | 12/1996 | Hiranuma et al. | |
| 5,595,213 A | 1/1997 | Brown | |
| 5,711,508 A | 1/1998 | Schreiber et al. | |
| 5,823,508 A | 10/1998 | Nie | |
| 6,026,855 A | 2/2000 | Jackson et al. | |
| 6,089,540 A * | 7/2000 | Heinrichs et al. | 251/149.6 |
| 6,176,263 B1 | 1/2001 | Lacroix et al. | |
| 6,220,570 B1 * | 4/2001 | Heinrichs et al. | 251/149.6 |

* cited by examiner

Primary Examiner—Paul J. Hirsch
(74) Attorney, Agent, or Firm—Young & Basile, P.C.

(57) ABSTRACT

A fluid quick connector in cartridge form carrying a shut off valve is mountable in a bore in a fluid charged use device. An end form retainer is mounted in the cartridge for locking an end form in a bore in the cartridge. The shut off valve is internally mounted within the cartridge to selectively open and close a flow path through the cartridge from the fluid use device to the end form.

28 Claims, 3 Drawing Sheets

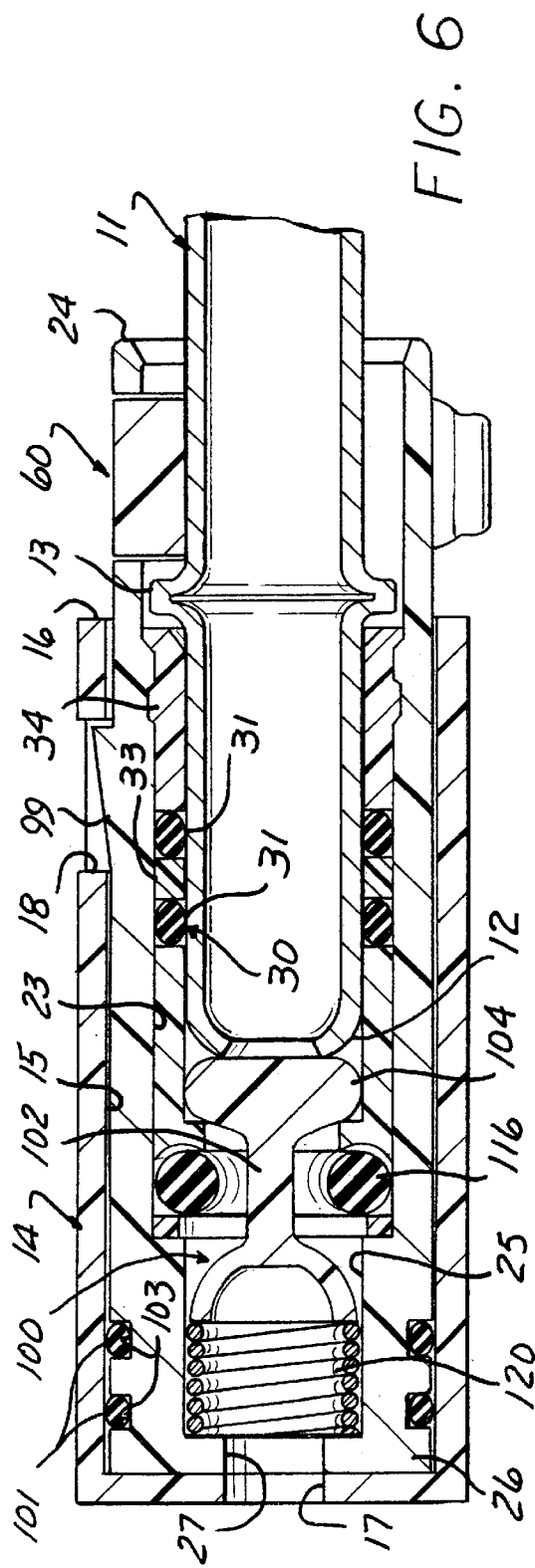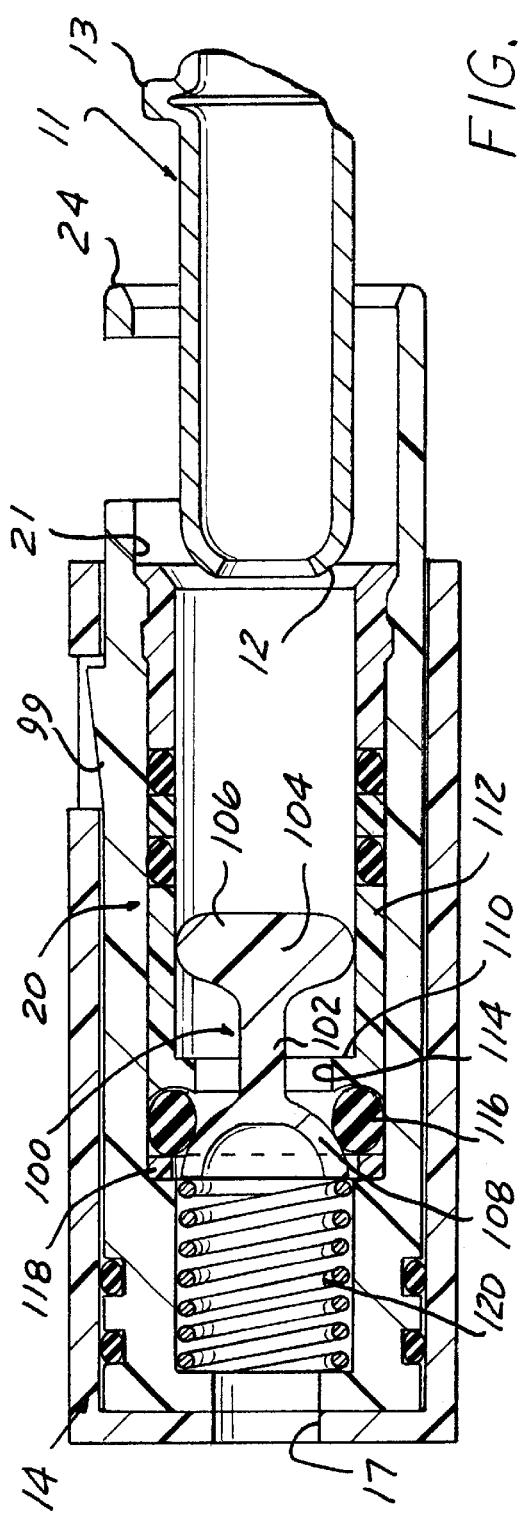

FLUID SHUT OFF VALVE CARTRIDGE WITH QUICK CONNECTION

BACKGROUND

The present invention relates, in general, to fluid quick connectors which couple fluid components.

Snap-fit or quick connectors are employed in a wide range of applications, particularly, for joining fluid carrying conduits in automotive and industrial application. Such quick connectors utilize retainers or locking elements for securing a male connector component, such as a tubular conduit, within a complimentary bore of a female connector component or housing. Such retainers are typically of either the axially-displaceable or radially-displaceable type. The terms "axially-displaceable" or "radially-displaceable" are taken relative to the axial bore through the female component.

In a typical quick connector with an axially displaceable, retainer, the retainer is mounted within a bore in a housing of the female connector component of housing. The retainer has a plurality of radially and angularly extending legs which extend inwardly toward the axial center line of the bore in the housing. A tube or male component to be sealingly mounted in the bore in the female component includes a radially upset portion or flange which abuts an inner peripheral surface of the retainer legs. Seal and spacer members as well as a bearing or top hat are typically mounted in the bore ahead of the retainer to form a seal between the housing and the male fitting when the male fitting is lockingly engaged with the retainer legs in the housing.

Radially displaceable retainers are also known in which the retainer is radially displaceable through aligned bores or apertures formed transversely to the main throughbore in the female component housing. The radially displaceable retainer is typically provided with a pair of depending legs which are sized and positioned to slip behind the radially upset portion or flange on the male conduit only when the male connector or conduit is fully seated in the bore in the female component. This ensures a positive locking engagement of the conduit with the female component as well as providing an indication that the conduit is fully seated since the radially displaceable retainer can be fully inserted into the female component only when the conduit has been fully inserted into the bore in the female component.

Regardless of the type of retainer, the female housing or component portion of a fluid connector typically includes an elongated stem having one or more annular barbs spaced from a first end. The barbs provide secure engagement with a hose or conduit which is forced over the barbs to connect the female housing with one end of the conduit.

Check valves have also been employed in quick connectors to block fluid flow when the male and female connector portions are disconnected. In such quick connectors, a check valve or ball is disposed within one bore of the connector and movable between two positions, one blocking fluid flow from one of the connector portions and another allowing fluid flow between the connector portions.

However, the housing of quick connector is separate from the fluid charged use device which is typically connected by a conduit or tube to the quick connector housing. This complicates the assembly of the fluid system and adds additional cost due to the increased number of separate components which must be manufactured and assembled together.

Thus, it would be desirable to provide a quick connect style cartridge with an internal check valve which can be mounted in a fluid charged use device without intervening conduits. It would also be desirable to provide such a quick connect with check valve cartridge which can be easily mountable in the fluid use device without tools or excessive modification of the use device to accommodate the quick connector. It would also be desirable to provide a quick connector with an internal check valve in a cartridge form which still provides quick connections to an external conduit or endform.

SUMMARY

The present invention is a fluid quick connector and a quick connector and fluid charge use device combination with includes a movable shutoff valve to automatically shutoff fluid flow from the use device when an endform is not fully inserted into the quick connector.

In one aspect, the present invention is a fluid quick connector for connecting a pressurized fluid use device having a bore opening to a fluid flow outlet in the fluid use device and an endform. A quick connector includes a cartridge adapted to be mountable in the fluid use device in fluid flow communication with the outlet of the fluid use device. A retainer in mountable in the cartridge for latching an endform to the cartridge. A shutoff valve is mounted in the cartridge and moveable between a first position blocking fluid flow though the cartridge, and a second position opening the cartridge to fluid communication with the outlet of the fluid use device and the endform.

Means are provided for fixedly mounting a cartridge in a bore in the fluid use device. The mounting means includes at least one latch member carried on the cartridge which is adapted to be engagable with a mating recess formed in the fluid use device.

At least one seal member is carried externally on the quick connector cartridge for sealingly coupling the cartridge to the fluid use device.

A reduced diameter orifice is formed in a through bore in the quick connector cartridge. The shutoff valve is movable through the orifice between the first and second positions in response to engagement with the shutoff valve.

In one aspect, the shutoff valve includes a stem having a first end and an opposed second end. A biasing means is seated in the housing and acts on the second end of the stem to normally bias the stem to the first position.

In another aspect, the invention is a fluid quick connector and fluid pressurized use device combination. The combination includes a through bore formed in the use device in fluid communication with a fluid flow outlet of the use device. The cartridge having a through bore extending between opposed ends. At least one seal member carried in the bore in the cartridge for sealing an endform insertable into the cartridge to the cartridge.

The present fluid quick connector and fluid connector and pressurized fluid use device combination provides a convenient arrangement for mounting an internal check or shutoff valve directly in a fluid use device and connecting an endform on another fluid carrying member to the fluid use device without the intervention of additional conduits.

BRIEF DESCRIPTION OF THE DRAWING

The various features, advantages and other uses of the present invention will become more apparent by referring to the following detailed description and drawing in which:

FIG. 6 is a longitudinal, side elevational, cross-sectional view of the quick connector shown in FIGS. 1–5, with the external endform in a fully inserted, locked position and the check valve in a fluid flow, open position; and FIG. 7 is a longitudinal, side elevational, cross-sectional view of the quick connector shown in FIGS. 1–5, with the check valve in a fluid blocking position.

DETAILED DESCRIPTION

The following description of the use of a fluid quick connector 10, a tubular member 11 having a tip end 12 and a raised annular bead or flange spaced from the tip end 11 will be understood to apply to the connection of any type of conduit, hose, and/or solid metal or plastic tube. The end of a conduit or tubular member inserted into the interior of one end of the quick connector will be defined as an endform. The endform can be a separate member which receives a separate hose or conduit at one end or a shape integrally formed on the end of an elongated metal or plastic tube. Further, the endform can be integrally formed on or mounted as a separate element to a fluid charged or pressurized use device, such as a pump, filter, etc., rather than as part of an elongated conduit.

Figure 2:
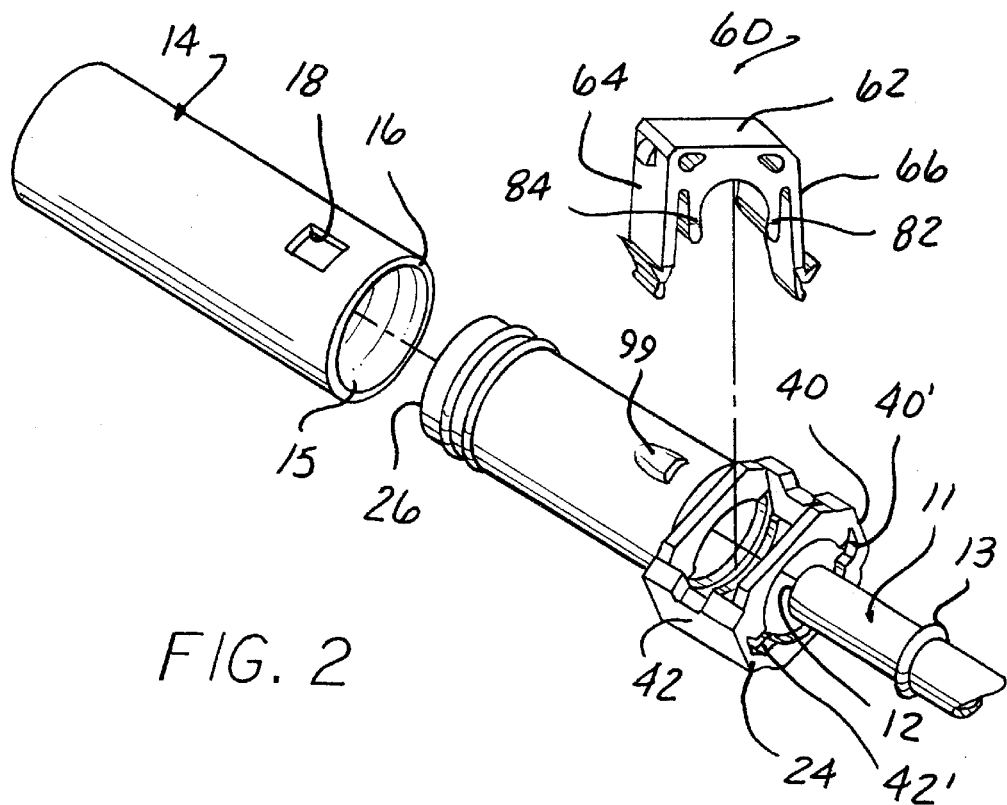
FIG. 2 is a perspective view of the assembled quick connector shown in FIG. 1.
Figure 1:
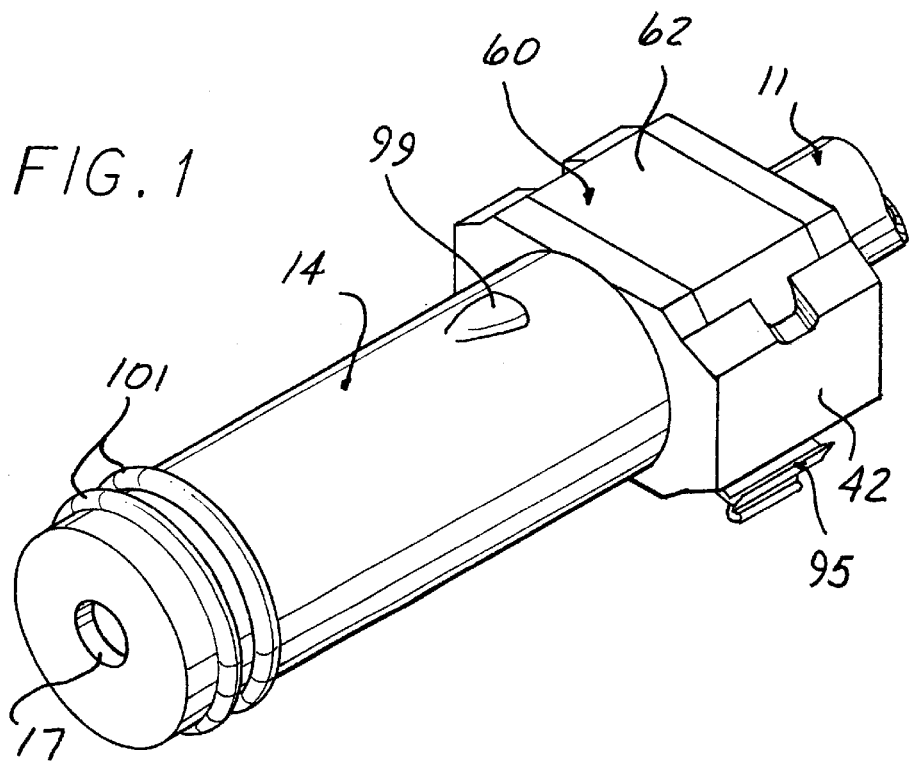
FIG. 1 is a perspective view of a quick connector cartridge with internal check valve according to the present invention.

FIGS. 1, 6 and 7 shown a fluid use element or housing 14 which is depicted by way of example only as being in the form of a tubular or cylindrical member. It will be understood that the tubular shape is depicted by example only, as the use device 14 may also form part of the fluid use device itself, such as a pump, a filter, manifold, etc.

By way of example only, the use device 14 includes a through bore 15 extending from a first outer end 16 to an opposed end which has a port or flow bore 17 extending therethrough in fluid communication with the through bore 15. At least one latch aperture 18 is formed in the wall of the use device 14 surrounding the bore 50, the purpose of which will be described in greater detail hereafter.

The quick connector 10 includes a housing 20 having an elongated, axially extending, internal stepped bore 22, shown in detail in FIG. 6, extending from a large diameter first, open end 24 to a smaller diameter, second open end 26. The stepped bore 22 includes a first bore portion 21 extending from an opening at the first end 24 of the housing 20 to a second smaller diameter second stepped bore portion 23. A third yet smaller diameter stepped bore portion 25 extends axially from one end of the second stepped bore portion 23 and communicates to a still smaller fourth stepped bore portion 27 which extends to the second end 26 of the housing 20.

As is conventional, a top hat or bearing 34 is mounted in the second stepped bore portion 23 immediately adjacent the end of the first bore portion 21. A seal means 30 is also mounted in the second stepped bore portion 23 between one end of the top hat 34 and the third stepped bore portion 25. The seal means 30 is formed, by example, of at least one and preferably two 0-rings 31 which are separated by a rigid, annular spacer 33.

The inner diameter of the first stepped bore portion 21 is sized to slidably receive the outer diameter of the radially enlarged flange or upset bead 13 formed on the endform 11. Further, the inner diameters of the seal means 30 and the top hat 34 are sized to sealingly engage the outer diameter of the end portion of the endform 11 extending from the radially enlarged flange 13 to the tip end 12 of the endform 11. The second stepped bore portion 23 has an inner diameter sized to snugly engage the outer diameter of the end portion of the endform 11 when the endform 11 is fully inserted into the stepped bore 22 as described hereafter.

Figure 4:
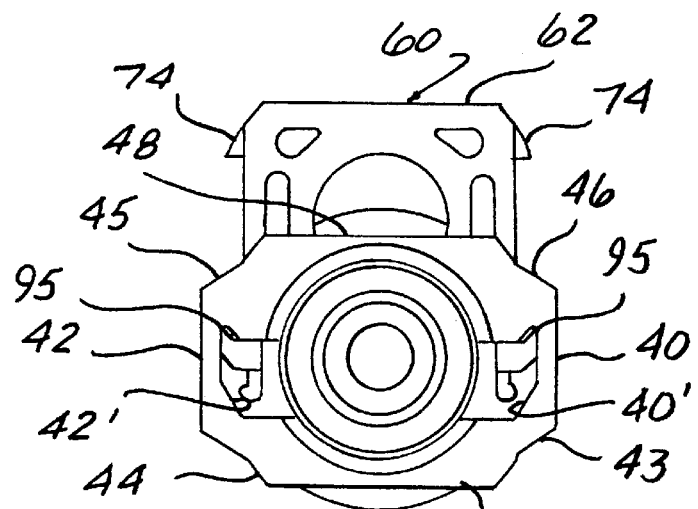
FIG. 4 is an end view of the quick connector shown in FIG. 1, with the retainer depicted in a partially inserted, storage position.
Figure 5:
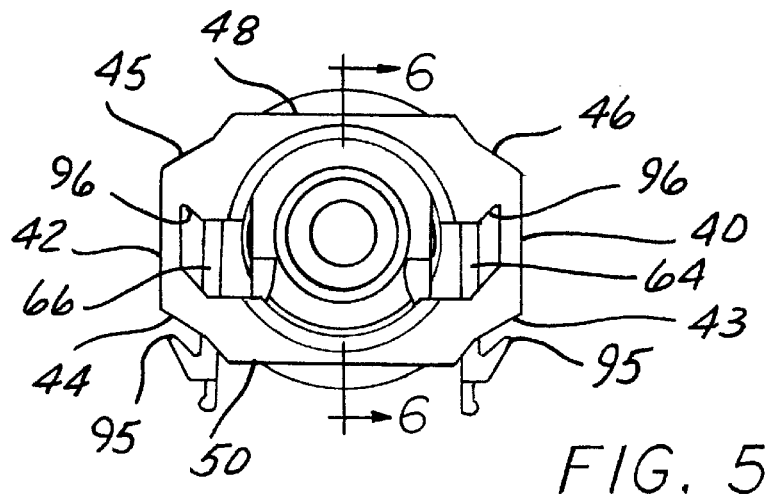
FIG. 5 is an end view of the quick connector shown in FIGS. 3 and 4, with the retainer depicted in the fully inserted, endform locking position in the quick connector housing.

As shown in FIGS. 1, 4, and 5, the first end 20 of the housing 12 is formed with a pair of opposed, exterior flat surfaces 40 and 42. The flat surfaces 40 and 42 are diametrically opposed on the first end 24 and may be centrally located on each diametrical side of the first end 24. The adjacent surfaces of the housing 20 to one side of the flat surfaces 40 and 42 form an opposed pair of lock surfaces or flats, such as a first flat 43 and a second flat 44. A second pair of flats 45 and 46 are formed on the housing 20 or the other side of the flat surfaces 40 and 42. The flats 43 and 44 extend axially a short distance from the first end 24 of the housing 20. Opposed surfaces 48 and 50 of the first end 24 of the housing 20 between the flats 43 and 44 and the flats 45 and 46 have a generally arcuate shape as shown in FIGS. 4 and 5. Apertures 49 and 51 are formed respectively in each surface 48 and 50. The apertures 49 and 51 are aligned to form a transverse bore extending through the first end 24 of the housing 20 which is disposed in communication with the first bore portion 21 in the housing 20.

A retainer 60, described hereafter, is by way of example only as other radially-displaceable retainer designs having side locking projections may also employ the release tool of the present invention. Alternately, the housing 20 can be reconfigured to receive an axial-type retainer.

The retainer 60 is formed of a one-piece body of a suitable plastic, such as polyphthalamide, for example, and has an end wall 62 formed of a generally curved or arcuate shape, again by way of example only, and first and second spaced side legs 64 and 66. The side legs 64 and 66 extend generally parallel to each other from opposite ends of the end wall 62. Further, each side leg 64 and 66 has an outer end 72, although it is also possible to connect the side legs 64 and 66 at a lower portion by an arcuate member.

A pair of projections 70 extend along the length of the retainer 10 between opposed side edges of the side legs 64 and 66, respectively. The projections 70 are located adjacent the outer end 72 of each leg 64 and 66. The projections 70 engage surfaces on the housing 20 to position the retainer 10 in the shipping position shown in FIG. 4, or in the fully inserted, latched position shown in FIGS. 5 and 6.

Further, a pair of outward extending lock tabs or edges 74 are formed adjacent the end wall 62 on each side leg 64 and 66 and engage notches in the edges of the flats 40 and 42.

As shown in FIGS. 1 and 3–5, the retainer 60 includes a radially flange receiving means 80 which is preferably carried as an integral, one-piece part of the retainer 60. The radial flange receiving means 80 includes first and second depending arms 82 and 84 which extend from a boss or enlargement 86 integrally formed on the inner surface of the end wall 62 of the retainer 60. An inverted, U-shaped slot 88 is formed on the inner surfaces of the arms 82 and 84 and the boss 86 which is sized to snugly conform to the outer diameter of the tubular portion of the endform 11. The outer ends 91 of each of the arms 82 and 84 are angled or tapered to act as a guide surface to assist in sliding movement of the arms 82 and 84 over the tubular end of the endform 11.

Figure 3:
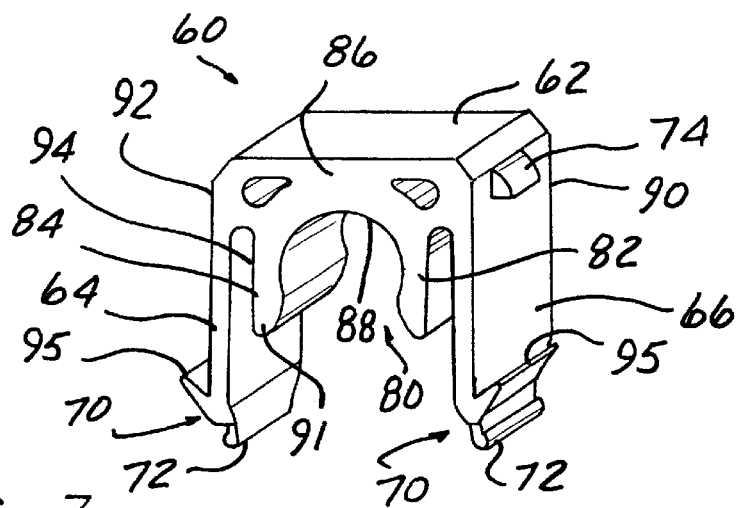
FIG. 3 is an enlarged, perspective view of the retainer employed in the quick connector shown in FIGS. 1 and 2.

As shown in FIGS. 1 and 3, each of the arms 82 and 84 extends from one side end contiguous with a first side end 90 of the retainer 60 to an opposed side end contiguous with a second side end 92 of the retainer 60.

As shown in FIGS. 1, 3, 4 and 5, the projections 70 on the legs 64 and 66 of the retainer 60 are formed with an angled hook-like shape terminating in a tip 95. The tip 95 is disposed at an acute, upturned angle with respect to the corresponding legs 64 and 66.

Similarly, as shown in FIGS. 4 and 5, the grooves 40' and 42' are formed in the interior of the flat surfaces 40 and 42, respectively, and include a recess or notch 96 at one end which is shaped complimentary to the shape of the tip 95 of the projection 70 on each of the legs 64 and 66 of the retainer 60. In this manner, pull out of the retainer 60 from the housing 20 is resisted by the interlocking tips 95 on the legs 64 and 66 of the retainer 60 which are seated within the notches 96 in the grooves 40' and 42' in the housing 20 as shown in the partially inserted, shipping position of the retainer 60 in FIG. 4. The flats or lock edges 44 and 46 are disposed at an angle complimentary to the acute angle of the tips 95 on the legs 64 and 66 of the retainer 60. This enables interlock of the tips 95 with the flats 44 and 46 resists pull out of the retainer 60 from the housing 20 from the fully latched position shown in FIG. 5.

The hook shaped tips 95 on the legs 64 and 66 of the retainer 60 in conjunction with the grooves 40' and 42' in the housing 20 also provide, a distinct, "avalanche effect" snap action of the retainer 60 in the housing 20. The grooves 40' and 42' in the housing 20 are formed in generally planar flat surfaces. The inner surfaces force the ends 72 of the legs 64 and 66 laterally inward toward each other when the retainer 60 is inserted into the housing 20. When the tips 95 clear one edge of the grooves 40' and 42', the resilient nature of the legs 64 and 66 snaps the ends 72 and the tips 95 laterally outward to create an "avalanche effect" which provides a distinct tactile feedback to the user indicating that the retainer 60 has lockingly engaged the housing 20 in either the partially inserted position shown in FIG. 4 or the fully inserted position shown in FIG. 5.

It should be noted that further insertion force on the retainer 60 moving the retainer 60 from the partially inserted position shown in FIG. 4 to the fully inserted position shown in FIG. 5 again causes the end 72 of the legs 64 and 66 to be urged laterally inward when the tips 95 of the legs 64 and 66 slide along the lower portion of the inner surfaces of the flats 40 and 42. When the tips 95 clear the outer end of the inner surfaces, the legs 64 and 66 spring laterally outward in a distinct "avalanche effect" manner. The lower ends of the grooves 40' and 42' are angled to enable the tips 95 to slide out of the grooves 40' and 42' toward the fully latched position.

The retainer 60 can be first be installed on the housing 20 in a shipping or storage position as shown in FIG. 4. In this position, the projections 70 on the side legs 64 and 66 of the retainer 60 snap into and engage the longitudinally extending grooves 40' and 42'.

Further insertion of the retainer 60 through the aligned apertures 49 and 51 in the housing 20 causes the ends 72 of the legs 64 and 66 to pass along the lower portion of the inner surfaces of the flat surfaces 40 and 42 until the tips 95 clear the ends of the surfaces and then snap outward exteriorly of the outer surface of the first end 24 of the housing 20 as shown in FIG. 5. In this fully inserted position of the endform 11 in the housing 20, the annular flange 13 on the endform 11 is situated ahead the arms 82 and 84 of the retainer 60. This position represents the fully latched position in which the endform 11 is fully seated in and lockingly engaged with the housing 20. The full insertion of the retainer 60 into the housing 20 also provides visible indication of the fully locked connection of the endform 11 to the housing 20, respectively.

It should be noted that if the endform 11 is not fully engaged or seated within the housing 20, the annular flange 13 on the endform 11 will not be properly situated within the transverse bore in the housing 20 to slidably receive the arms 82 and 84 in the retainer 60. If the annular flange 13 on the endform 11 is at any position other than that shown in FIG. 6, the arms 82 and 84 on the retainer 60 will contact the annular flange 13 on the endform 11. Since the spacing between the inner surfaces of the legs 82 and 84 is less than the outer diameter of the annular flange 13, the retainer 60 cannot be moved to the fully inserted position thereby providing an indication of an incomplete seating or mounting of the end portion of the endform 11 in the housing 20.

The housing 20 also includes a fluid flow shut off valve 100 which automatically blocks or shuts off fluid flow from the use device though the bore 17 and the bore 22 when the endform 11 is not fully inserted into the housing 20. Only when the endform 11 is fully inserted into the housing 20, does the shut off valve 100 shift to a position opening fluid flow from the port 17 in the use device 14 through the bore 22 to the endform 11.

The shut off or check valve 100 is in the form of a resilient member having a stem 102 which interconnects a enlarged first end 104 having a generally planar end surface 106 and an opposed, inverted, hemispherical, concave, cup-shaped second end 108. The enlarged first end 104 is limited in axial movement between a shoulder 110 formed on a tubular collar 112 inserted in the second stepped bore portion 23 of the step bore 22 in the housing 20. The generally planar end surface 106 of the first end 104 extends diametrically across the bore 114 adjacent to the shoulder 110 to allow fluid flow around the thin cross section, first end portion 104 when the valve 100 is in the second position shown in FIG. 7.

A seal member, such as an 0-ring 116, is mounted along with an optional rigid spacer 118 in the end portion of the second stepped bore portion 23 of the stepped bore 22 adjacent to the shoulder 110 in the collar 112. The seal member 116 interacts with the cup-shaped, second end portion 108 of the valve 100 to completely block fluid flow between the bore 22 and the housing 20 and the port bore 17 in the surrounding use element housing 14. It should be noted that although the first end portion 104 of the valve 100 extends substantially across the entire diameter of the stepped bore along one axis, the first end portion is formed relatively thin in a perpendicular axis. On the other hand, the cup-shaped second end portion 108 has a diameter to fully cover the inner diameter of the 0-ring seal 116 to block all fluid flow past the seal 116 when the cup-shaped portion 108 is in engagement with the seal 116.

A biasing means, such as a coil spring 120, is mounted in the third stepped bore portion 25 in the housing 20. The spring 120 seats between an end portion of the third stepped bore portion 25 and the peripheral edge of the cup-shaped, second end portion 108 of the valve 100. The spring 120 normally biases the valve 100 axially into the stepped bore 22 in the housing 20 to a first, normal position shown in FIG. 7. This first position is the fluid blocking position since the cup-shaped end portion 108 of the valve 100 is disposed in sealing engagement with the seal member 116.

In use, the housing 20 carrying the pre-loaded shut-off valve 100 as well as the retainer 60 partially last, storage position shown in FIG. 4, is inserted into the bore 15 in the use element 14. A latch element, typically in the form of a projection 99 having a ramped or inclined outer surface, is provided on the exterior surface of the housing 20 at a position to engage the aperture 18 in the use element 14 when the housing 20 is substantially fully inserted into the bore 15 in the use element 14 as shown in FIGS. 6 and 7. The resilient nature of the material used to form the housing 20 will provide a slight amount of deformation sufficient to enable the enlarged end portion of the projection 99 to deform radially inward as well as to expand the end portion of the use element 14 radially outward until the projection 99 snaps into the aperture 18. This locks the housing 20 to the use element 14.

At least one and preferably two seal members, such as O-rings 101, are mounted in annular, open ended grooves 103 adjacent the opposite end of the housing 20. The O-rings 101 form a seal with the surrounding inner surface of the bore 15 in the use element 14 to sealingly couple the housing 20 to the use element 14.

Upon full insertion of the end portion of the endform 111 into the stepped bore 22 in the housing 20, as shown in FIG. 6, at which position the retainer 60 can be moved to the fully latched position show in FIG. 5, the tip end portion 12 of the endform 111 will have previously engaged and slid the valve 100 to the left, in the orientation shown in FIGS. 6 and 7, overcoming the biasing force of the spring 120. When the endform 11 is in the fully inserted position in the housing 20, as shown in FIG. 6, the valve 100 will have moved to a position in which only the smaller diameter stem 102 of the valve is positioned inside of the opening through the O-ring seal 116. This allows a fluid flow path to be formed between the bore extending through the endform 11, past the sides of the first end portion 104 of the valve 100, across the stem 102 and around the periphery of the second portion 108 of the valve 100, through the spring 120 and into the port bore 17 in the surrounding use element 14.

However, immediately upon separation of the endform 11 from the housing 20, the valve 100 will axially shift bringing the end portion 108 into sealing engagement with the O-ring seal 116 blocking further fluid flow from the use element 14 through the housing 20.

In summary there has been disclosed a unique quick connector with an internally mounted shut off valve and carrying a latching retainer which can be mounted in a use element, such as a fluid charged device, to establish an normally closed, but openable flow path from the use element through the quick connector to a fluid carrying member. The shut off valve is positioned for engagement with an end of an endform inserted into the quick connector housing and is then moveable to an open position allowing fluid flow from the use element, through the quick connector housing and into the endform only when the endform is fully inserted into the housing. The retainer latches the endform in the housing.

The present quick connector with shut off valve enables a shut off valve to be easily applied to a fluidically charged use element without extensive modification to the existing use element. At the same time, the quick connector provides the normal quick connector attachment functions to external endforms, conduits or tubes.

What is claimed is:

1. A fluid quick connector for connecting a pressurized fluid use device having a bore opening to a fluid flow outlet in the fluid use device, and an endform, the quick connector comprising:
   a cartridge adapted to be mountable in the fluid use device in fluid flow communication with the outlet;
   a retainer mountable in the cartridge for latching an end form in the cartridge;
   a shutoff valve mounted in the cartridge, the shut off valve moveable between a first position blocking fluid flow through the cartridge, and a second position opening the cartridge to fluid communication with the outlet of the fluid use device and endform.

2. The quick connector of claim 1 further comprising:
   means for fixedly mounting the cartridge in a bore in a fluid use device.

3. The quick connector of claim 2 wherein the mounting means comprises:
   at least one latch member carried on the cartridge, the latch member adapted to be engagable with a recess formed in the fluid use device upon insertion of the cartridge into the bore.

4. The quick connector of claim 3 wherein:
   the latch member is an inclined ramp projecting outwardly from the cartridge.

5. The quick connector of claim 1 further comprising:
   at least one seal member carried externally on the cartridge for sealingly coupling the cartridge to the fluid use device.

6. The quick connector of claim 2 wherein the mounting means comprises:
   latch elements carried on the cartridge adapted for engagement with the fluid use device.

7. The quick connector of claim 6 wherein the latch elements comprise:
   a latch projection extending from the quick connector housing.

8. The quick connector of claim 7 wherein:
   the latch projection has an inclined ramp surface.

9. The quick connector of claim 1 further comprising:
   a reduced diameter orifice formed in a through bore in the cartridge;
   the shut off valve moveable through the orifice between the first position blocking fluid flow through the orifice and the second position opening the orifice to fluid flow.

10. The quick connector of claim 9 wherein the shut off valve comprises:
    a stem having a first end and an opposed second end; and
    a biasing means seated in the housing and acting on the second end of the stem to normally bias the stem to the first position of the shut off valve.

11. The quick connector of claim 1 further comprising:
    the retainer movable through the cartridge to a latched position on the cartridge locking an end form in the cartridge.

12. The quick connector of claim 11 wherein:
    the retainer is transversely mountable through the cartridge with respect to a longitudinal axis of a through bore extending through the cartridge.

13. The fluid quick connector of claim 1 further comprising:
    a biasing member mounted in the cartridge for normally biasing the shutoff valve to the first position.

14. The quick connector of claim 1 further comprising:

the cartridge having a through bore extending between opposed ends;

at least one seal member carried in the bore in the cartridge for sealing the endform insertable into the cartridge to the cartridge.

15. A fluid quick connector and a fluid pressurized use device combination comprising:

a through bore in the use device, the through bore in fluid communication with the fluid flow outlet of the use device;

a cartridge mountable in the bore in the receiver;

a retainer mountable in the cartridge adapted for latching an end form in the cartridge;

a shutoff valve mounted in the cartridge, the shut off valve moveable between a first position blocking fluid flow from the outlet of the use device, and a second position opening the bore in the cartridge to fluid communications with the outlet of the use device; and a biasing member, mounted in the cartridge, for normally biasing the shutoff valve to the first position.

16. The combination of claim 15 further comprising:

means for fixedly mounting the cartridge in a bore in a fluid use device.

17. The combination of claim 16 wherein the mounting means comprises:

at least one latch member carried on the cartridge, the latch member adapted to be engagable with a recess formed in the fluid use device upon insertion of the cartridge into the bore.

18. The combination of claim 17 wherein:

the latch member is an inclined ramp projecting outwardly from the cartridge.

19. The combination of claim 15 further comprising:

at least one seal member carried externally on the cartridge for sealingly coupling the cartridge to the fluid use device.

20. The combination of claim 16 wherein the mounting means comprises:

latch elements carried on the cartridge adapted for engagement with the fluid use device.

21. The combination of claim 20 wherein the latch elements comprise:

a latch projection extending from the quick connector housing.

22. The combination of claim 21 wherein:

the latch projection has an inclined ramp surface.

23. The combination of claim 15 further comprising:

a reduced diameter orifice formed in a through bore in the cartridge;

the shut off valve moveable through the orifice between the first position blocking fluid flow through the orifice and the second position opening the orifice to fluid flow.

24. The combination of claim 23 wherein the shut off valve comprises:

a stem having a first end and an opposed second end; and a biasing means seated in the housing and acting on the second end of the stem to normally bias the stem to the first position of the shut off valve.

25. The combination of claim 15 further comprising:

the retainer movable through the cartridge to a latched position on the cartridge locking an end form in the cartridge.

26. The combination of claim 25 wherein:

the retainer is transversely mountable through the cartridge with respect to a longitudinal axis of a through bore extending through the cartridge.

27. The combination of claim 15 further comprising:

a biasing member mounted in the cartridge for normally biasing the shutoff valve to the first position.

28. The combination of claim 15 further comprising:

the cartridge having a through bore extending between opposed ends;

at least one seal member carried in the bore in the cartridge for sealing the endform insertable into the cartridge to the cartridge.

* * * * *